United States Patent [19]

Weidanz et al.

[11] 4,135,800
[45] Jan. 23, 1979

[54] CASSETTE FOR STACK OF SINGLE FILMS

[76] Inventors: Herbert Weidanz, Kursiefener Str. 16a, 5074 Odenthal-Globusch; Horst Auf Dem Graben, Auf dem Steitacker, 24, 5000 Cologne 90, both of Fed. Rep. of Germany

[21] Appl. No.: 823,439

[22] Filed: Aug. 10, 1977

[30] Foreign Application Priority Data

Sep. 10, 1976 [DE] Fed. Rep. of Germany ....... 2640715

[51] Int. Cl.² ...................... G03B 19/10; B65D 85/48
[52] U.S. Cl. ...................................... 354/174; 206/455
[58] Field of Search ........................ 206/455; 250/480; 354/275, 276, 174

[56] References Cited

U.S. PATENT DOCUMENTS

| 2,286,010 | 6/1942 | Rabkin | 354/174 |
| 2,878,389 | 3/1959 | Raffman | 250/480 X |
| 2,906,182 | 9/1959 | Booth et al. | 354/174 X |

Primary Examiner—Donald A. Griffin

[57] ABSTRACT

The cassette comprises a cover fitted on a bottom in a light-proof manner. The film stack is contained in a foil pack. A light trap allows the foil to be pulled from the cassette flattened. A pair of piercing and cutting knives are arranged to cut through the foil pack the full depth of the film stack. The edge of the knives serve as retaining stops for the film stack as the foil pack is pulled from the cassette. At a distance a little larger than the length of the stack, a cross cutter is arranged to cut off the end of the tube so that it can be pulled from the cassette.

12 Claims, 6 Drawing Figures

CASSETTE FOR STACK OF SINGLE FILMS

The invention relates to a cassette for the reception of a plurality of flat rectangular single films which have the same emulsion orientation and are located in a stack so that they are approximatley in coincidence and superimposed, the cassette comprising a cavity shaped approximately like a rectangular parallelepiped for the reception of the stack and comprising a bottom part, through which the lowest single film can be moved, and comprising a cover part fitting thereon in a light-proof manner.

Cassettes of this type are used, for example, in the field of medicine. They are operated in cameras photographing, for example fluorescent X-rays. The cameras have photographing speeds of approximately two pictures per second to 12 pictures per second. It is, of course, also possible to take single pictures. However, the relatively high photographing speeds have the advantage that it is also possible to record sequences. Because of the high single picture consumption, there are assorted in the stack, for example, 50 single pictures which have the meanwhile standardized format of 100 × 100 mm. An orientation notch has been cut into one side of the single films. The stack is wrapped in paper and packed with the latter in a foil arrangement which has a polyethylene layer on the inside, an aluminum foil in the middle and a usually black paper layer on the outside. The foil arrangement is very closely adapted to the stack. The foil arrangement is packed, in turn, in a small box comprising a bottom shell and a cover, whose edge is glued to a warranty strip. The cost share of this packing is high and is of the same order as the films themselves. Prior to photographing, the stack has to be inserted into a more expensive cassette. For this purpose, a person takes the cassette and a new box into a dark room, opens the box and rips up the foil arrangement. He removes the stack from the foil arrangement, feels for the notch and places the stack into the cassette.

The consumption of single films is already high for original photographs, but for copying for recording purposes it is even higher. It can easily happen that 1000 copies are made per day in a hospital.

The films are not exposed to light while lying in the cassette. In the base of the removable cassette, there are perforations allowing feeding mechanisms to engage, which position the single films in front of the camera aperture and into the objective ray path.

The known cassettes have the following disadvantages:

a. Loading in daylight is impossible. A dark room and its expenditure are absolutely necessary.

b. In order to fill the cassettes, one has to leave the photographing unit and go into the dark room.

c. Only skilled persons reliably know what position the notches must have and also where the emulsion side is located in relation to the notch.

d. If one wants to avoid the problem of continuous reloading, one has to buy a number of cassettes. However, these are expensive.

e. If one has a plurality of cassettes and one is not very careful, it can happen that one mistakes unloaded cassettes for loaded ones.

f. It is absolutely necessary to remove the stack from the packing by hand; this may cause finger prints to be produced on the single films.

g. In the same way as in a card game, it is very difficult to hold 50 single pictures securely by hand. If the stack slips, one cannot find it in the darkness.

h. It happens that some of the 50 individual films slip in the dark room without this being noticed. Contrary to one's expectations, the cassette is then only partly loaded.

i. If, for example, 1000 copies are made per day in a hospital and one has four cassettes, this means that 5 × 4, that is to say 20 cassettes have to be loaded.

j. Known daylight loading leads to a voluminous wastage of a very varied nature, namely box parts plus foil arrangement parts plus reinforcing cardboard.

It is the object of the invention to indicate a cassette which avoids the afore-mentioned disadvantages and provides a comparatively cheap solution and allows the cassette to be loaded in daylight in conjunction with a special packing, for example like that described in German patent application No. P 26 32 041.2, and whose handling does not impose any substantial requirements on the staff and from which the single pictures can be removed in the hitherto usual way for the actual photographing operation.

According to the invention, this problem is solved by the following features:

a. On one longitudinal area of the cassette, there is provided a light trap which allows a flat foil tube to be pulled from the cavity.

b. At a distance from the light trap, there is provided in the cassette at least one piercing/cutting knife which is approximately vertical to the plane of the foil tube and whose inner straight cutting edge projects inwards over its effective length to at least the same degree as the height of the stack and which extends parallel to the contour plane provided there and which serves as a retaining stop for the stack in the cavity.

c. Provided parallel to this contour plane but at a distance therefrom which is not much larger than the edge length of the stack is a cross-cutter, by means of which the foil tube can be cut off, so that it is open in the direction of the cross-cutter.

Such a cassette makes it unnecessary to run to and fro between the dark room and the photographing unit; only a single cassette is required; the loading operation time is reduced to a few seconds and requires less skill. The cassette provides a minimum of wastage which is, moreover, of uniform shape.

Two piercing and cutting knives are provided in the cassette which are arranged at a considerable distance from one another and having aligned straight cutting edges, as viewed from the side. These features ensure that, due to the straight cutting edges, the stack has two bearing edges and that it cannot be easily canted when the foil tube is pulled off and that the lateral guidance of the stack or the foil tube in the cassette cavity thus no longer has to be absolutely accurate.

A resilient plate covers the piercing and cutting knife at least over the largest portion of its length and, is tranversed by the knife through a fitting slot therein and is arranged to release the piercing and cutting knife while springing back. These features ensure that the risk of injury on the piercing/cutting knives is reduced and that the pressure exerted by this plate can also be exploited for producing a light trap portion.

The piercing and cutting knife is positioned relative to the stack to pierce and cut at a very short distance behind the stack. These features ensure that there is no need for the piercing/cutting knives to cut through any foil tube cross-weldment or cross-gluing which may be present and that the cutting force to be applied is also more uniform because first the upper foil layer is cut through and the lower foil layer is cut only after another distance has been covered. This is better than two directly adjoining foil layers having to be cut through simultaneously.

The piercing and cutting knife is provided on the cover part. These features ensure that the piercing/cutting knives work upon the closure of the cassette. The foil tube therefore remains undamaged almost to the end and it is impossible for any dust, light and moisture to penetrate it. Furthermore, no special manipulation is necessary, for example in order to press the foil tube into the knives.

The cross-cutter comprises a knife and a counter-knife, one being provided on the cover part and the other on the bottom part. These features also ensure that cutting is effected only very late during the closing movement and that this does not necessitate any special operation. This would be necessary, if, for example, the cross-cutter were designed as a draw-knife which is operable from the exterior, as is the case in some miniature cameras.

One knife is rigid and stiff, and the other knife is inherently elastic and can be deflected normally to its length, the cutting edge of the elastic knife being directed, in its position of rest, towards the front of the rigid knife, the elastic knife having in its end area starting the cut, a curved tongue which slides forward of the front of the rigid knife on the cutting flank thereof, and these knives form at least part of a light trap. These features ensure a cut that is always neat and smooth and that the elasticity of the other knife equalizes any errors of alignment. Furthermore, this solution is cheap and can be easily rendered light-proof.

A positioning device outside the cross-cutter positively co-operates with the portion of the foil tube located outside the cross-cutter. These features ensure the correct position of the foil tube together with the single film stack in the cavity of the cassette and prevent the piercing/cutting knives from cutting into the edge of the stack or the cross-cutter from cutting beyond a welded or glued seam.

The positioning device comprises two pins which are aligned in a lateral view and which point from the bottom part to the cover part and are adapted in their contours to the shape of corresponding positioning holes in the foil tube. These features ensure a particularly simple positioning device. If the pins are provided so that they are unsymmetrical relative to the center plane of the cassette, then it is possible to ensure at the same time that the foil tube and the stack are positioned correctly in the cassette.

A hold-down is provided outside the cross-cutter portion for the portion of the tube which is cut off. These features ensure that it is impossible for the cut foil tube portion to pass into the machinery while the inserted film stack is being used or while a loading operation takes place.

A spring urges the hold-down in the closing direction; the force exerted by this spring can be cancelled by the opening movement. These features ensure that the holding-down means automatically opens when the cover is opened and automatically holds the foil tube portion to be cut off when the cover is closed.

The cover part is swingably hinged to the bottom part on the far side of the cross-cutter. These features ensure both an easy hinging and, above all, the correct time sequence, namely first the holding-down of the foil portion to be cut off, the ripping-up of the foil tube by the cross-cutter, possibly with the aid of longitudinal tension, and the plunging of the piercing/cutting knives.

Further advantages and features of the invention will emerge from the following description of a preferred exemplified embodiment. In the full-scale drawings.

Figure 3:
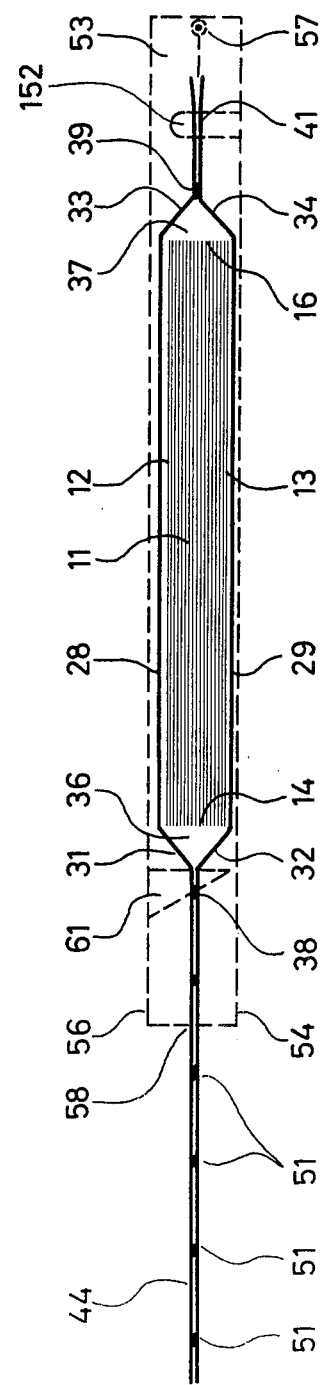
FIG. 3 shows a section along the line 3—3 shown in FIG. 1.

A stack 11 is 100 mm wide and 100 mm long and consists of 50 single films whose emulsion side, according to FIG. 3 and 7, points to the top. The stack 11 has a top end 12, a bottom end 13, a left-hand edge 14, a right-hand edge 16, a front edge 17 and a rear edge 18. The stack 11 has the shape of a rectangular parallelepiped. It consists only of single films.

An envelope 19 consists of a material which is approximately 0.1 mm thick and is made up of a polyethylene foil 21 in the inside, an aluminium foil 22 in the center, and a polyester foil 23 on the outside.

The envelope 19 is formed as a tube by a longtiduinal seam 24. The longitudinal seam 24 extends over the entire length of the envelope 19. The envelope 19 is so dimensioned that it encloses the stack 11 neither quite tightly nor in such a loose manner that the coherence between the single films is lost. Due to the stiffness of the polyester foil 23, the envelope 19 extends on both sides of the front edge 17 and the rear edge 18 in small curves 26, 27 and rests against the top 12 and the bottom 13. To the left and right of the left-hand edge 14 and the right-hand edge 16 respectively, the envelope 19 is even less close-fitting. Here, the top 28 and the bottom 29 form oblique areas 31, 32, 33, 34 which extend at an angle of approximately 45° and form distinct gussets 36, 37 of prismatic shape. At the end of each gusset 36, 37 there is provided a cross-seam 38, 39 which extends over the entire envelope 19. The longitudinal seam 24 is also crossed by it. In accordance with the full-scale representation, the areas 31, 32, 33, 34 are of considerable length and the gussets 36, 37 have a greater volume than that left between the small curves 26, 27 and the front edge 17 and the rear edge 18 respectively. The areas 31, 32 and 33, 34 respectively are of equal length, so that the cross-seams 38, 39 are provided approximately half-way up the stack 11. To the right of the cross-seam 39, the envelope 19 merges in a holding strip 41 which is approximately 2 cm long, as shown in the drawing. The holding strip has two holes 42, 43 which pass through the top 28 and the bottom 29. They are circular.

To the left of the cross-seam 38, the envelope 19 merges in an approximately 11 cm long pull strap 44. In the area thereof, the top 28 and the bottom 29 are flat. The strap is 11 cm in width, so that its effective circumference is approximately 22 cm, which is an adaptation to 50 10 × 10 single films.

In the area of the stack 11, the envelope 19 is approximately 10.5 cm wide and, as viewed from the center in the direction of the cross-seams 39, 38, then forms cushion tips 46, 47, 48, 49.

The pull strap 44 comprises numerous cross-welds 51 which are provided, for example, at intervals of 1 to 2 cm and extend in parallel as well as vertically to the longitudinal direction of the envelope 19.

For being used, the single pack is placed into the cassette 53 which comprises a bottom part 54 and a top part 56 and is shown in broken lines in FIG. 3. These parts are of course light-proof in their closed state.

At the end that is to the right in FIG. 3, the parts are connected by a hinge 57. In the cassette, there is provided a cutting device (not shown) which allows the gusset 37 to be cut off to the left of the cross-seam 39 by separation of the areas 33, 34. This may be effected, for example, by placing the top part 56 on the bottom part 54 or there may be provided a draw knife such as is known on roll film cameras or the like device. To the right of the light trap 58, which is not shown in detail, the top part 56 is furthermore provided with two vertically downwardly projecting knives 59, 61, which have a pointed triangular shape and whose right-hand edges an designed both as a cutting edge and as a contact edge. When the top part 56 is folded down, the knives 59, 61 penetrate the envelope 19 somewhere to the left of the left-hand margin 14. This may be either to the left of the cross-seam 38, in the cross-seam 38 or to the right of the cross-seam 38 in the gusset 36. If the pull strap 44 is now pulled to the left, while the cassette 53 is closed, the knives cut the top and bottom 28, 29 open. As pulling continues, the left-hand margin 14 comes to rest against the cutting edges 61 and is thus positioned in an approximate manner. The stack 11 is now disposed in the cassette 53 and can be singled in the usual way. These singling mechanisms are known and feed a single film to the exposure aperture of the camera.

Expediently, there are provided in the area of the hinge 57 in the bottom part 54 two vertically upwardly pointing pins 152 which pass through the holes 42, 43 position the packing in the cassette 53 and retain the cut-off holding strip 41. In addition to the pins 152, provision may of course be made for the holding strip 41 to be clamped.

Figure 4:
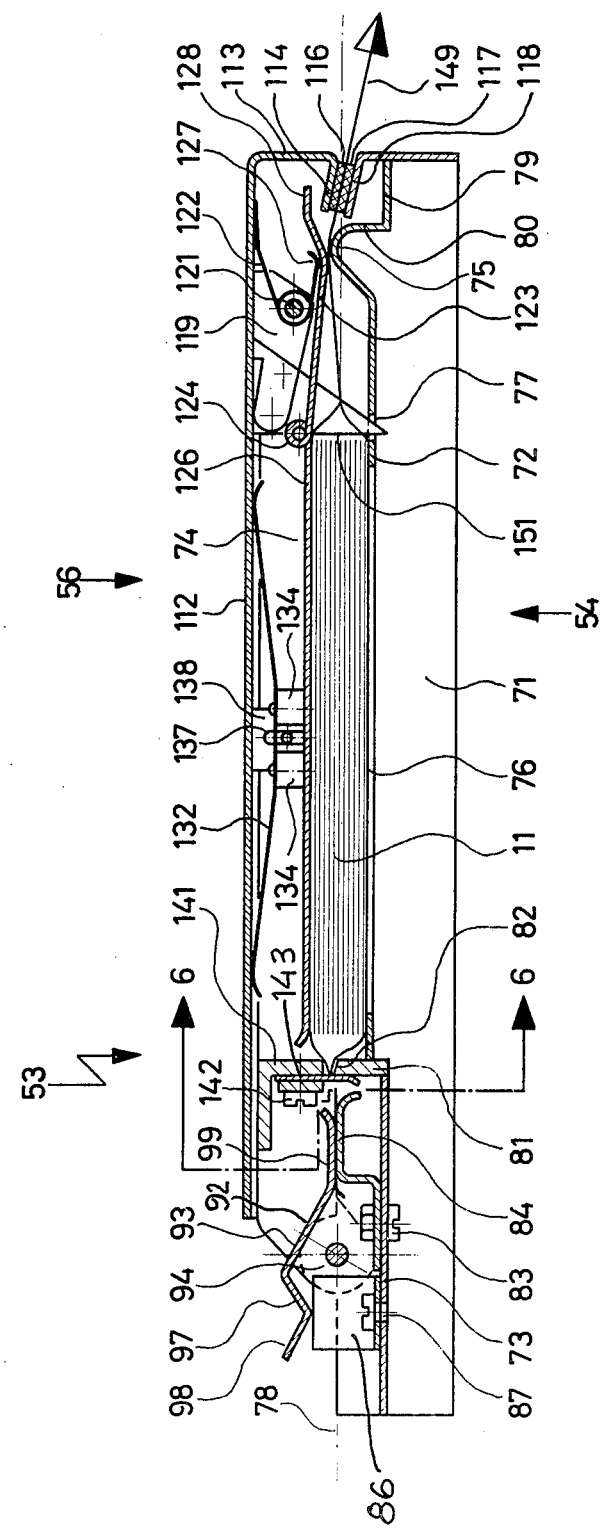
FIG. 4 shows a sectional side view of an actually constructed cassette.

On the cassette 53 shown in detail in FIGS. 4 to 6, there is again visible the bottom part 54 and the top part 56. The bottom part 54 can be placed by its apron 71 on holders of the singling mechanism which is not shown. As shown in FIG. 4, the bottom part 54 comprises an elevated bottom 72 and a bottom 73 which is lower than the latter. The bottom 72 bounds a cavity 74, which has the shape of a rectangular parallelepiped, at the bottom and comprises beneath the cavity 74 a very large window 76, from which the single films can be fetched in the downward direction. Thus, only the edge areas of the stack 11 rest on the bottom 72. To the right of the window 76, the bottom 72 has two small longitudinal slots 77 for the tips of the knives 59, 61.

Still further to the right, the bottom 72 merges in a transverse trough 80 which is shaped upwardly to a considerable extent and whose top has a gentle rounding 75 and is in a higher position than the horizontal central plane 78 of the stack 11. The transverse trough 80 is adjoined by a narrow horizontal web 79.

To the left of the window 76, there is provided a rigid, approximately rectangular transverse knife 81, whose front 82 drops in the direction of the cavity 74 and is in a higher position than the central plane 78. To the left of the transverse knife 81, the foot of an approximately U-shaped transverse strip 84, which is open towards the bottom and whose top is aligned with the central plane 78, is screwed on by means of the screws 83. To the left of the transverse strip 84, the two ends of a plate spring 86 are fastened across the bottom 73 by means of the screws 87 and the spring is curved towards the top, as shown in FIG. 4.

In upwardly projecting eyes 88, 89, there is mounted a hinge rod 91 which is located at a short distance from and to the right of the plate spring 86 in the area between this latter and the transverse strip 84.

A clamping strap 92 comprises a straight center web 93, from whose ends the ears 94, 96 are angled vertically downwards and are rotatably mounted on the hinge rod 91, which lies in the center plane 78. The center web 93 merges via an angle 97 in a tang 98 which is directed at approximately 10 o'clock in its state of rest, as shown in FIG. 4. The plate spring 86 is wide enough to prevent the knee between the tang 98 and the angle 97 from slipping during the swivel movement. On the right-hand side, the center web 93 merges in a contact-pressure strip 99, which is directed towards 3 o'clock and thus in the horizontal direction and is arranged above the transverse strip 84 in its state of rest. It is possible to retain the holding strip 41 between the transverse strip 84 and the contact-pressure strip 99.

Figure 1:
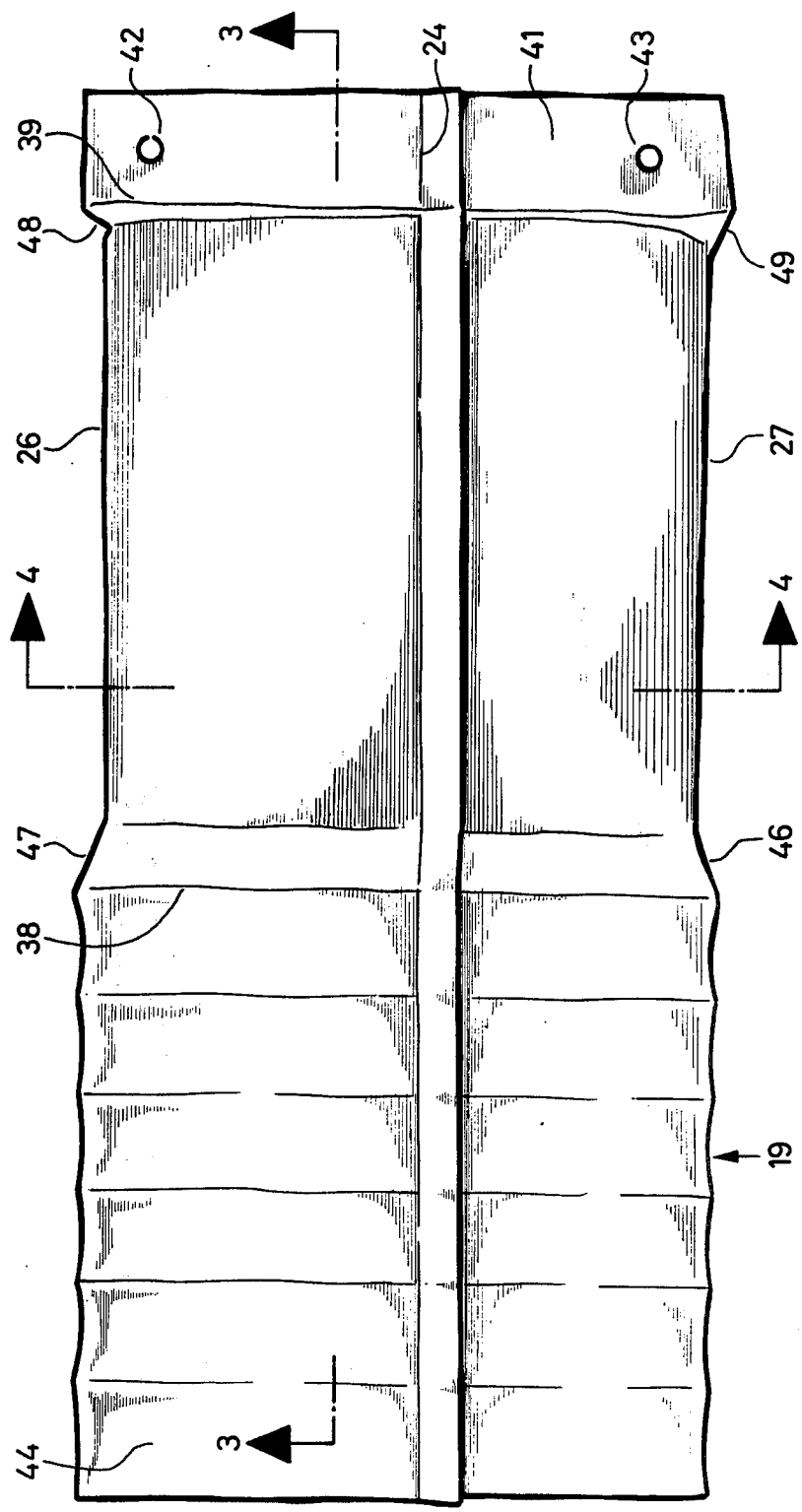
FIG. 1 shows a top view of a single film pack.
Figure 2:
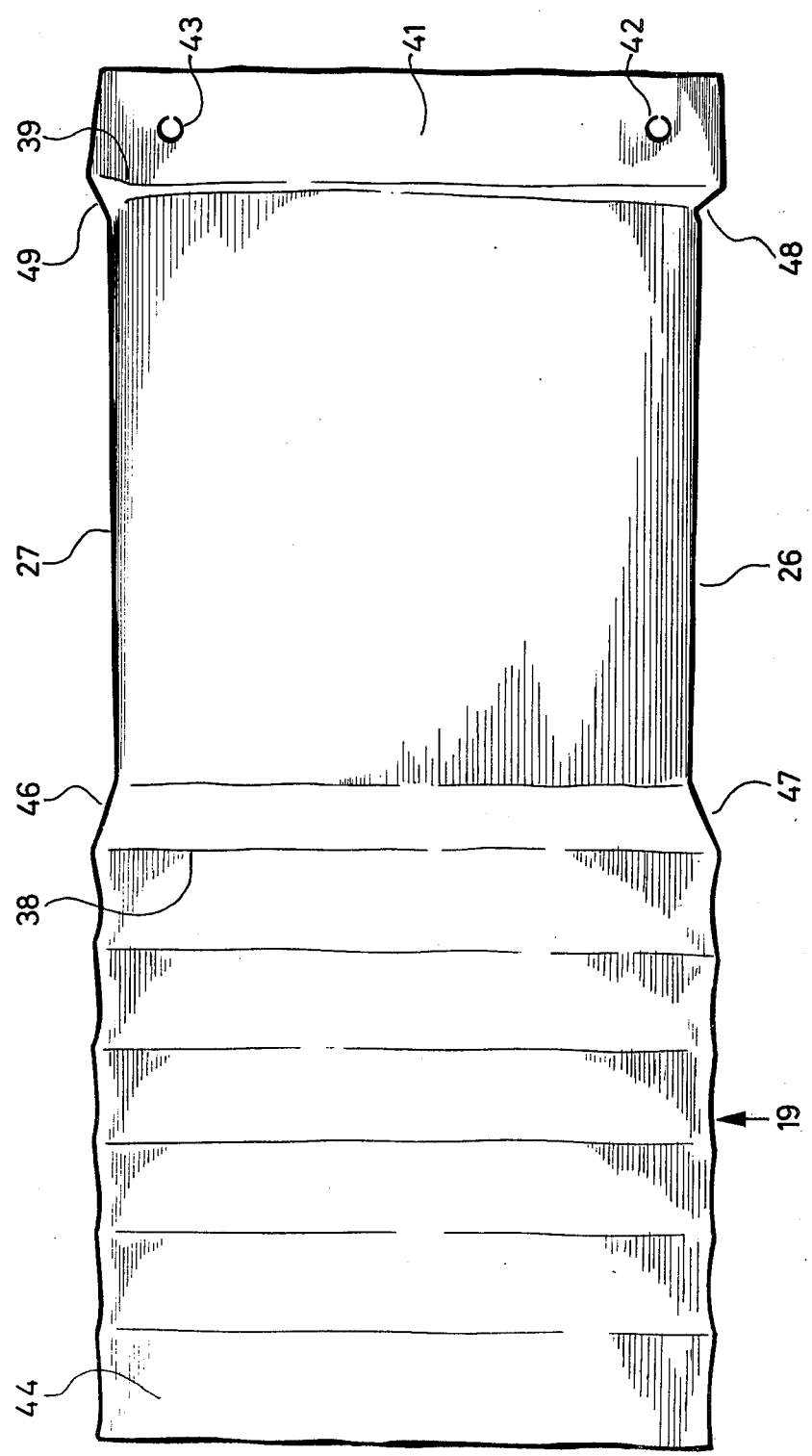
FIG. 2 shows a bottom view of the pack shown in FIG. 1.
Figure 5:
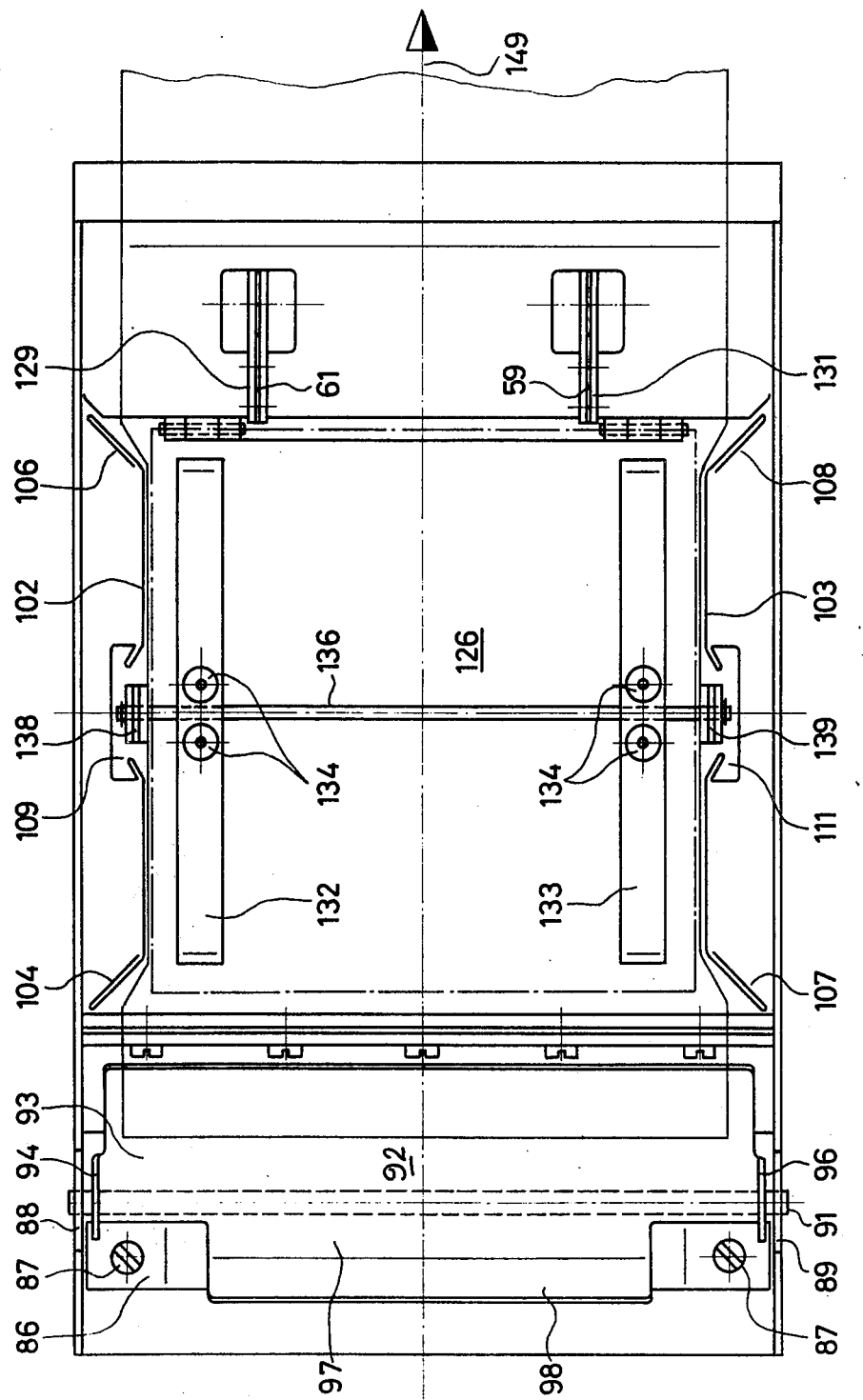
FIG. 5 shows a top view on respect of FIG. 4, but without the cover plate.

As is apparent, above all, from FIG. 5, the cassette 53 is wider than the packing shown in FIGS. 1 and 2. For this reason, limiting plates 102, 103, which extend in the longitudinal direction and are vertical to the bottom 72, are provided in the bottom part 54, at both sides of the cavity 74, at a spacing of 101 mm chosen in consideration of the 100 mm wide stack 11 and the tube thickness. At their ends, the limiting plates 102, 103 merge in obliquities 104, 106, 107, 108 which are adapted to the shape of the cushion tips 46, 47, 48, and 49. The limiting plates 102, 103 comprise vertical guides 109, 111 in their centers.

The top part 56 fits on the bottom part 54 substantially like the upper part of a box. The top part 56 has a rear wall 112 with aprons which are pulled downwards laterally. According to FIG. 4, and when viewed from right to left, there extends at the lower edge of the apron 113 a strip 114 which is approximately directed at the rounded area 75 and is lined on its underside with black velvet 116. Together with the velvet 117 on the parallel strip 118, there is thus formed a first light trap.

The holders 119 carry on pins 121 spiral springs 122 which are supported on the rear wall 112, on the one hand, and on a flap 123, on the other hand, which flap is connected to a contact-pressure plate 126 via a cross-hinge 124. In the closed state of the cassette 53, the flap 123 is supported, by a rounded portion 127, on the rounded portion 75, thus forming a second light trap. The spiral springs 122 are only capable of urging the flap 123 outwards until a tab 128 thereof strikes against the strip 114.

Longitudinal slots 129, 131 for the knives 59, 61 are also provided in the flap 123.

The contact-pressure plate 126 supports in its interior two longitudinally extending curved plate springs 132, 133 whose centers are curved in the downward direction. Spacers 134 are inserted between the plate springs 132, 133 and the contact-pressure plate 126. A transverse bar 136 extends between the spacers 134. In the area in which it projects from the contact-pressure plate 126, the cross-bar 136 traverses the longitudinal slots 137 which are provided in downwardly projecting guides 138, 139. There is thus formed a vertical guide, and the longitudinal slots 137 ensure that the contact-pressure plate 126 cannot be urged too far to the exterior. As shown in FIG. 5, there are provided on both sides of the guides 138, 139 shims and quite on the outside snap rings.

Figure 6:
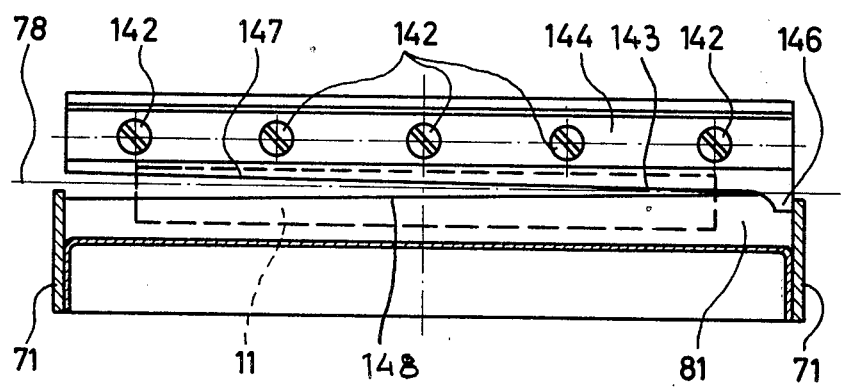
FIG. 6 shows a section along the line 6—6 shown in FIG. 4.

To the left of the contact-pressure plate 126, there is provided a knife holder 141, which is L-shaped in cross section and whose vertical part is disposed above the transverse knife 81 when the top part 56 is in its closed state. As shown, a band knife 143 is held on the knife holder 141 by means of screws 142 in an exchangeable manner, the pressure being distributed through an I-shaped strip 144. The band knife 143 has the thickness of thin sheet-metal and, as shown in FIG. 6, a tongue 146 at the right-hand side, which is bent to the left, as shown in FIG. 4, and projects considerably beneath the cutting edge 147. Thus, during the closing process, first the tongue 146 impinges on the transverse knife 81 and the cutting edge 147 successively cuts the tubular foil open from right to left forward of the front 82. As shown in FIG. 6, the cutting edge 147 and the front edge 148 extend at an acute angle relative to the central plane 78.

In their left-hand areas, the right-hand and left-hand aprons of the top part 56 are traversed by the end areas of the hinge bar 91, so that a hinged articulation is provided.

During the operation of the cassette 53, the top part 56 is opened and since, as shown in FIG. 4, approximately as from 10 o'clock the rear wall 112 takes along the tang 98 in the anti-clockwise sense, the contact-pressure strip 99 lifts from the cross-strip 84. The plate springs 132, 133 have pressed the contact-pressure plate 126 to the outside and, in co-operation with the spiral springs 122, have also pressed the flap 123 to the outside, so that the knives 59, 61 are protected to a far-reaching extent. Now a pack is inserted, as shown in FIGS. 1 and 2 and indicated in FIGS. 4 to 6. If the pack is provided with the holes 42, 43 and the cassette 53 with the pins, which are only shown in FIG. 3, then the pack is also positioned thereby. Otherwise, the limiting plates 102, 103 and the depression provided by the transverse knife 81 as well as the obliquities 104, 106, 107, 108 serve as positioning aids. Now the top part 56 is closed. As from 10 o'clock, the contact-pressure strip 99 clamps the holding strip 41. Shortly before the top part 56 is completely closed, the contact-pressure plate 126 presses the stack 11, with the envelope 19, so that it is fixed in the cavity 74; the band knife 143 starts to cut; the knives 59, 61 emerge from the longitudinal slots 129, 131 and plunge into the areas 31, 32. When the position shown in FIG. 4 is reached (at FIG. 6), the cassette 53 is not yet completely closed. One then pulls the pulling strap 44 in the direction of the arrow 149. The straight cutting edges 151 of the knives 59, 61 pointing to the left, as shown in FIG. 4, now hold the left-hand margin 14 of the stack 11 in the correct position in the cavity 74. Of course, the knives 59, 61 cut the envelope 19 open lengthwise during this process and since this latter has been cut open at the left-hand side by the band knife 143, it is possible to pull the major portion of the envelope 19 to the right without taking along the stack 11. The holding strip 41 is, of course, left between the contact-pressure strip 99 and the transverse strip 84.

What is claimed is:

1. A cassette for the reception of a plurality of flat rectangular single films, whose emulsion sides are orientated in the same direction and which lie one upon the other in a stack so that they are approximately in coincidence, the cassette having a cavity shaped approximately like a rectangular parallelpiped for the reception of the stack in a foil tube and comprising
    a bottom part through which the lowest single film can be transported,
    a cover part, which fits thereon in a light-proof manner,
    a light trap at one longitudinal area of the cassette which allows the flat foil tube to be pulled from the cavity,
    at least one piercing and cutting knife in the cassette at a distance from the light trap, which is approximately vertical to the plane of the foil tube and having an internal straight cutting edge which projects inwards over its effective length at least the height of the stack and extends parallel to the contour plane of the stack provided there and serves as a retaining stop for the stack in the cavity, and
    a cross cutter parallel to this contour plane at a distance from it that is slightly larger than the edge length of the stack, by means of which the foil tube can be cut off, so that it is open in the direction of the cross-cutter.

2. A cassette as claimed in claim 1, wherein two piercing and cutting knives are provided in the cassette which are arranged at a considerable distance from one another and having aligned straight cutting edges, as viewed from the side.

3. A cassette as claimed in claim 1 comprising a resilient plate covering the piercing and cutting knife, at least over the largest portion of its length, and which is transversed by the knife through a fitting slot therein and which is arranged to release the piercing and cutting knife while springing back.

4. A cassette as claimed in claim 1, wherein the piercing and cutting knife is positioned relative to the stack to pierce and cut at a very short distance behind the stack.

5. A cassette as claimed in claim 1, wherein the piercing and cutting knife is provided on the cover part.

6. A cassette as claimed in claim 1, wherein the cross-cutter comprises a knife and a counter-knife, one being provided on the cover part and the other on the bottom part.

7. A cassette as claimed in claim 6, wherein one knife is rigid and stiff, and the other knife is inherently elastic and can be deflected normally to its length, the cutting edge of the elastic knife being directed, in its position of rest, towards the front of the rigid knife, the elastic knife having in its end area starting the cut, a curved tongue which slides forward of the front of the rigid knife on the cutting flank thereof, and wherein these knives form at least part of a light trap.

8. A cassette as claimed in claim 6, comprising a positioning device outside the cross-cutter which positively co-operates with the portion of the foil tube located outside the cross-cutter.

9. A cassette as claimed in claim 8, wherein the positioning device comprises two pins which are aligned in a lateral view and which point from the bottom part to the cover part and are adapted in their contours to the shape of corresponding positioning holes in the foil tube.

10. A cassette as claimed in claim 1, comprising a hold-down outside the cross-cutter for the portion of the foil tube which is cut off.

11. A cassette as claimed in claim 10, comprising a spring which urges the hold-down in the closing direction; the force exerted by this spring can be cancelled by the opening movement.

12. A cassette as claimed in claim 1, wherein the cover part is swingably hinged to the bottom part on the far side of the cross-cutter.

* * * * *